Patented Dec. 19, 1950

2,534,707

UNITED STATES PATENT OFFICE 2,534,707

PREPARATION OF PHOTOGRAPHIC EMULSIONS

Charles F. Glick, New Brunswick, N. J., and Postell M. Nicholes, Rochester, N. Y., assignors to E. I. du Pont de Nemours & Company, Wilmington, Del., a corporation of Delaware No Drawing. Application November 27, 1946, Serial No. 712,732

9 Claims. (Cl. 95—7)

This invention relates to the preparation of hydroxyl polymer silver halide emulsions. More particularly it relates to a process of preparing such emulsions free from water-soluble halides. Still more particularly it relates to a process of preparing synthetic hydroxyl polymer silver halide emulsions in gel form and to the washing of soluble salts therefrom.

Silver halide emulsions have been made with various types of synthetic water-soluble or hydrophilic hydroxyl polymers, e. g., polyvinyl alcohol, partially hydrolyzed polyvinyl acetate and interpolymers thereof, and their ethers and acetals as the binding agents for the silver halide grains. These polymers, which contain sufficient aliphatic hydroxyl groups or intralinear vinyl alcohol units

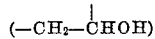

$$(-CH_2-CHOH)$$

to make them hydrophilic or soluble in cold or hot water, do not set or gel like gelatin upon "chilling." Gelatin emulsions readily set upon chilling and can be shredded or extruded into small discrete particles or noodles. The particles can then be washed substantially free from soluble salts, e. g., halides, nitrates, etc.

It has been proposed to coagulate the above-described synthetic hydroxyl polymer-silver halide emulsions by means of acetone and/or concentrated sodium sulfate solutions but these methods have some disadvantages. Sometimes curdy masses are formed which are tough and rubbery. Other times soft slimy masses are formed. If such masses are broken or separated into small particles, they coalesce markedly during washing.

An object of this invention is to provide synthetic hydroxyl polymer-silver halide emulsions of improved characteristics. A further object is to provide such emulsions which are substantially free from water-soluble salts. A still further object is to provide a practical method of preparing such emulsions and washing the same substantially free from water-soluble salts. Still other objects will be apparent from the following description of the invention.

It has been discovered that synthetic hydroxyl polymer-silver halide emulsions of good gelling characteristics can be made by treating an aqueous solution of such emulsions with a mixture of (1) a soluble boron compound which forms a borate ion in aqueous solution, e. g., boric acid or a boric acid ester or a salt of a boric acid, e. g., sodium metaborate, potassium tetraborate, sodium borate, etc., and (2) a coagulating agent taken from the group consisting of methanol, ethanol, acetone, and concentrated alkali metal salt solutions, e. g., alkali metal sulfate, phosphate and silicate solutions, each of said components being in insufficient quantity alone to effect a material gelling of the synthetic hydroxyl polymer and adjusting the pH of the resulting solution to more than 7. After gelling has been effected, the compounds are extruded into a bath containing a synthetic hydroxyl polymer hardening or coagulating agent, e. g., acetone and/or concentrated aqueous sodium sulfate.

The emulsion may initially be acid or alkaline but is preferably acid, e. g., having a pH of 4.5 to 6.9, when the polyvinyl alcohol polymers are free from hydrolyzable groups, e. g., acetal and ether groups. Polyvinyl acetal and ether emulsions initially should have a pH of 7 to 12. When the synthetic hydroxyl polymer emulsion is mixed with a boron compound, the mixture should have a pH greater than 7, e. g., 7.5 to 12. This causes the boron compound to exhibit a gelling action. It may be present in the form of an ionized alkaline salt during the gelling.

The aqueous solution of the boric acid compound and the coagulating agent should be added slowly to the aqueous synthetic hydroxyl polymer-silver halide emulsion while vigorously stirring the latter at a temperature of 5° C. or less to 80° C. or more. After the addition is complete, the admixture is allowed to set or coagulate. This may be expedited by lowering the temperature or chilling. The resulting gel is fairly firm and fairly compact and can be readily converted into small discrete particles by shredding or extruding through a die plate in the form of noodles into a hardening bath, e. g., acetone or a concentrated salt solution, in a manner similar to that used for shredding or noodling gelatin emulsions. The particles are then washed with cold water several times whereby the excess soluble salts are removed and the particles are substantially free from such salts. A portion of the boron compound is also removed during the washing. The emulsion particles do not coalesce during the washing treatment.

The washed emulsion particles can then be liquefied by the addition of water or water-ethanol solutions and digested for various periods. Various emulsion constituents, e. g., sensitizing dyes, fog inhibitors, wetting agents, soluble halides, e. g., sodium bromide and potassium chloride, sulfur sensitizers, e. g., sodium thiosulfate and thiosinamine, can be added during such treatment and the final emulsions coated onto a support to form photographic emulsion layers of good quality and surface characteristics. Additional hydroxyl polymer can be admixed with the washed emulsion prior to digestion, if desired.

Synthetic hydroxyl polymers of the water-soluble and hydrophilic type include polyvinyl alcohol and its partially substituted water-soluble lower fatty acid esters, lower alkyl esters, and lower acetals. Polyvinyl alcohol is a tough, white, amorphous material. It is soluble in water. The more highly polymerized varieties are soluble in hot water and the medium or lower polymers are soluble in cold water. They are usually prepared by hydrolysis of polyvinyl esters, such as polyvinyl acetate, polyvinyl chloracetate, polyvinyl isobutyrate, etc. The partly hydrolyzed esters which contain a large number of recurring vinyl alcohol units $(-CH_2-\overset{|}{C}HOH)$ or free hydroxyl groups are water-soluble or hydrophilic in character. These partial esters can be made by esterifying the completely or partially hydrolyzed polyvinyl acetate, etc. The polyvinyl acetals, e. g., polyvinyl acetaldehyde acetal and polyvinyl isobutyral, can be made by incomplete acetalization of polyvinyl alcohol or partially hydrolyzed polyvinyl acetate, etc.

In addition to the synthetic hydroxyl polymers just described, there may be mentioned partially and completely hydrolyzed polyvinyl ester, e. g., polyvinyl acetate, copolymers with various mono-ethylenically unsaturated compounds having a terminal $CH_2=C<$ group, such as vinyl chloride, acrylic acid esters, e. g., methyl acrylate; methacrylic acid esters, e. g., methyl methacrylate; and mono-olefines, e. g., ethylene. The completely hydrolyzed ethylene/vinyl acetate interpolymer emulsion described in McQueen 2,397,866 and Roland 2,386,347 form an important class of synthetic hydroxyl polymers useful as binding agents for the silver halide emulsions made in accordance with this invention.

The hydroxyl polymers may contain color-former nuclei. Suitable polymers of this type are described in United States Patents 2,310,943, 2,320,422, 2,397,864, and 2,397,865 and in United States application Serial Number 528,946, now Patent No. 2,415,381. These polymers, as well as the polymers described above, are characterized by the fact that they contain a number of free hydroxyl groups or vinyl alcohol $(-CH_2\overset{|}{C}HOH)$ units in an aliphatic linear carbon chain. The polyvinyl acetal color formers in some instances can be effectively gelled by means of the boron compounds alone. The gels should be hardened before washing, however, by means of a coagulating bath. Thus, the gels may be extruded into acetone or concentrated sodium sulfate solution.

It has been found that the boric acid esters of polyhydric alcohols are eminently well suited as gelling agents in conjunction with the above-described coagulating agents. The mixture causes a rapid gelling of silver halide emulsions and results in a product which can be washed free from soluble salts. Such esters can be prepared by reacting a polyhydric alcohol, e. g., ethylene glycol, diethylene glycol, triethylene glycol, erythrol, sorbitol, mannitol, etc., with boric acid or a mixture of boric acid and borax, by heating the admixture to 100° C. to 160° C. A copious evolution of water occurs. The resulting products are viscous syrups or resins of a colloidal nature and have a high molecular weight and complex structure. They are readily soluble in water but are substantially insoluble in hydrocarbons but probably hydrolyze to the boric acid and glycol in water. Their preparation is described in United States Patents 1,953,741, 2,223,349, 2,223,948, 2,223,949, and 2,224,011. These compounds have been referred to as boriborates.

In order to maintain the pH of the emulsions below 6, a small amount of a readily soluble acid, e. g., glycolic acid, acetic acid, diglycolic acid, etc., or acid reacting salt, e. g., ammonium chloride and nitrate, may be added to the colloid silver halide emulsion before admixing it with the mixture of the soluble boron compound and coagulating agent. The presence of the acid gives an effective control for preventing the gelling action until the mixture is again made alkaline.

The invention will be further illustrated but is not intended to be limited by the following examples. The parts are by weight.

EXAMPLE 1

The following three aqueous solutions were made:

Solution A

| | Cc. |
|---|---|
| Potassium iodide (0.5 N) | 86 |
| Water | 600 |

Solution B

| | Cc. |
|---|---|
| Silver nitrate (3 N) | 500 |
| Ammonium hydroxide (20%) | 300 |
| Water | 600 |

Solution C

| | Cc. |
|---|---|
| Completely hydrolyzed ethylene vinyl acetate interpolymer of mol ratio of 0.04 of ethylene to 1.0 of vinyl acetate-ethanol-aqueous solution of 10/10/80 ratio by weight | 1720 |
| Ammonium bromide (3 N) | 530 |
| Water | 430 | and Solutions A and C were brought to a temperature of 112° F. Solution B was brought to a temperature of 95° F. Solutions A and B were added separately but simultaneously to Solution C with stirring over a period of three minutes. The resulting mixture was ripened by heating at a temperature of 112° F. for a period of 15 minutes and one unit of ripened emulsion was obtained.

Two units of a ripened emulsion were made as described in the preceding paragraph, brought to a temperature of 112° F., and a mixture of 128 cc. of a 10% aqueous solution of a reaction product of diethylene glycol, borax, and boric acid (prepared as described in United States Patent 1,953,741 by heating a mixture of diethylene glycol, borax, and boric acid to 100° to 160° C.) and 5280 cc. of a 2% aqueous solution of $Na_2HPO_4 \cdot 7H_2O$ added with stirring over a period of five minutes. Immediate gelation occurred, followed by rapid syneresis, to produce a rather firm, brittle gel from which the liquid was easily decanted. The gel was extruded through a die plate with widely spaced 5 mm. diameter holes into an acetone bath. The resulting noodles were washed for five minutes in five successive batches of cold water (65° F.) and showed no tendency to dissolve.

The washed noodles were heated for 15 minutes at 150° F. and the resulting solution was cooled to 90° F. and then diluted with water to a suitable coating viscosity. The solution was digested at 130° F. for 60 minutes and 100 cc. of a 3% aqueous solution of N-cetylbetaine and 220 cc. of a 20% aqueous solution of triethanolamine added and the resulting solution coated onto a support, e. g., paper or a film base which may be provided with a suitable anchoring substratum.

EXAMPLE II

One-half unit of a ripened emulsion of the type described in Example I was prepared and a mixture of 1333 cc. of 9% aqueous sodium sulfate and 15 cc. of a 10% aqueous solution of diethylene glycol-borax-boric acid reaction product of Example I added with stirring over a period of ten minutes. The interpolymer silver halide emulsion coagulated into a gel, portions of which were noodled after the manner described in Example I into 9% aqueous sodium sulfate and acetone baths, respectively. In each case, some dehydration and insolubilization occurred and the noodles were of good quality and washed well with successive baths of water.

EXAMPLE III

Two units of a ripened emulsion of the type described in Example I were prepared and a mixture of five liters of acetone and 600 cc. of 1% aqueous diethylene glycol-borax-boric acid reaction product of Example I added over a period of ten minutes. A firm gel was formed which was allowed to synerize for a period of 15 minutes and was then extruded through a die plate into five liters of acetone and allowed to stand for about 15 minutes. The noodles formed were of good strength and washed well in seven successive baths of 5% aqueous sodium sulfate for 15 minutes, followed by one washing in pure cold water for 15 minutes. The washed noodles readily dissolved in a dilute (5.3%) aqueous solution of a hydrolyzed ethylene/vinyl acetate interpolymer of the same characteristics at a temperature of 150° C. A slight residue remained. The solution was digested at a temperature of 130° F. for 60 minutes and then coated onto a support to form an emulsion of good quality.

EXAMPLE IV

One-fourth unit of a ripened emulsion of the type described in Example I was prepared and a mixture of one liter of methanol and 8 cc. of a 10% aqueous solution of diethylene glycol-borax-boric acid reaction product of Example I was added with stirring over a period of five minutes. The emulsion coagulated slowly and completely to yield a soft, frangible gel. It was extruded through a die plate into 600 cc. of acetone and allowed to stand for two minutes. The product was noodled again in like manner and allowed to stand for 30 minutes and the acetone was then drained off. The resulting noodled particles were firm and showed no tendency to coalesce on washing in a plurality of baths of cold water for five minutes each. The washed noodles readily and completely dissolved in a 5.3/5.3/89.4% by weight hydrolyzed ethylene/vinyl acetate/ethanol/water solution at 150° F. The resulting solution was coated like an ordinary flowable, aqueous gelatino-silver halide solution onto a baryta coated paper support. The baryta coating was made by dissolving 7.58 grams of ammonium sulfate in 70.5 cc. of water, adding the solution to 470 grams of a 10% solution of a hydrolyzed ethylene/vinyl acetal interpolymer of the above type. To the mixture was added in 30 seconds 11.75 grams of barium chloride in 470 cc. of water, 3 cc. of a 0.5% aqueous solution of Monastral Fast Blue BWD, 5 cc. of a 5% saponin solution, and 200 cc. of a 10% aqueous solution of diethylene glycol boriborate and 5.7 grams of glycollic acid were added and the resulting solution coated onto the paper base. The coating was dried at 40° C. for 30 minutes. The silver halide emulsion layer gelled in 30 seconds to a smooth, firm coating.

EXAMPLE V

One-fourth unit of a ripened hydrolyzed ethylene/vinyl acetate interpolymer silver halide emulsion of the type described in Example I was prepared and 33 cc. of glacial acetic acid was added to neutralize the ammonia. A solution of 2100 cc. of methanol and 18.5 cc. of 10% diethylene glycol-borax-boric acid reaction product of Example I was admixed with the emulsion over a period of 30 seconds. Next was added, over a period of 30 seconds, 66 cc. of 20% $NH_4OH$. Good coagulation was noted and a soft gel was formed which synerized to a firm, brittle gel. It was extruded in the form of noodles into 630 cc. of acetone. The resulting noodles were washed with successive batches of water until free from soluble salts and dissolved in 640 cc. of water.

EXAMPLE VI

The following solutions were prepared:

*Solution A*

|  | Cc. |
|---|---|
| Potassium iodide (0.5 N) | 86 |
| Water | 600 |

*Solution B*

|  | Cc. |
|---|---|
| Silver nitrate (3 N) | 500 |
| Ammonium hydroxide | 300 |
| Water | 600 |

*Solution C*

|  | Cc. |
|---|---|
| 10/10/80 by weight: Polyvinyl alcohol/ethanol/water | 1550 |
| Ethanol | 350 |
| $NH_4Br$ (3 N) | 530 |

These solutions were brought to temperature and mixed exactly as in Example I. They were then mixed with 2120 cc. of 9% aqueous $Na_2SO_4$ and 192 cc. of 1% diethylene glycol-borax-boric acid reaction product of Example I during a period of 2 to 3 minutes. After standing 13 minutes, the curds were extruded into 2400 cc. of acetone and allowed to stand for 30 minutes. The emulsion was then washed and prepared for coating as described in Procedure B.

EXAMPLE VII

A hydrophilic mixed polyvinyl acetal of m-(benzoylacetamido)benzaldehyde and o-sulfobenzaldehyde (Na salt) was prepared as described in McQueen Serial Number 667,126, filed May 3, 1946, now Patent No. 2,464,597, and used as the yellow color former in Solution C below. Solutions A, B, and C, as follows, were used to make one unit of emulsion:

*Solution A*

|  | Cc. |
|---|---|
| Potassium iodide | 86 |
| Water | 600 |

Temperature, 112° F.

*Solution B*

|  | Cc. |
|---|---|
| Silver nitrate | 500 |
| Ammonium hydroxide | 300 |
| Water | 600 |

Temperature, 95° F.

*Solution C*

|  |  |  |
|---|---|---|
| Yellow polyvinyl acetal color former | grams | 1550 |
| Ethanol | cc | 350 |
| Ammonium bromide 3 N | cc | 530 |

Temperature, 112° F.

Solutions A and B were simultaneously added to Solution C over a three minute period with stirring. The solution had the ratio 5/10/85 of resin/ethanol/water by weight. The pH was adjusted to 7.5 with 5% NaHCO3 solution.

One-fourth unit of the above yellow polyvinyl acetal color former silver iodobromide and 700 cc. of ethanol were admixed at 112° F. and then a mixture of 175 cc. of 9% aqueous Na2SO4 and 240 cc. of 1% diethylene glycol-borax-boric acid condensation product of Example I were added over a period of two minutes. Coagulation was very nearly complete. The resulting gel was extruded in noodle form into 2500 cc. of 9% sodium sulfate solution and allowed to harden for 30 minutes. The noodles washed well with several wash waters and readily dissolved at 170° C. in an aqueous ethanol solution of the above yellow polyvinyl acetal color former.

EXAMPLE VIII

One unit of a magenta polyvinyl acetal color former silver halide emulsion was prepared as described in Example VII, except that 560 cc. of water were used in Solution A and one liter of ethanol in Solution B, by substituting for the yellow color former thereof m-[p-(5-ethylcarbonato - 3 - methyl - 1 - pyrazolyl)benzamido]-benzaldehyde polyvinyl acetal prepared as described in application Serial Number 682,137, filed July 8, 1946, now Patent No. 2,476,988.

One-fourth of the above unit was mixed with 125 cc. of ethanol and 375 cc. of water and then 40 cc. of 1% diethylene glycol-borax-boric acid condensation product of Example I was added. Complete coagulation took place and the resulting gel was extruded as noodles into 625 cc. of 9% sodium sulfate and allowed to stand for 15 minutes. The resulting noodles were washed, mixed with 200 cc. of ethanol, 100 cc. of water, and heated ten minutes at 150° F. with stirring. Six hundred seventy-five cubic centimeters (675 cc.) of a 3.5% solution of the above magenta polyvinyl acetal color former in dilute aqueous ethanol was added with stirring over a period of 20 minutes at 150° F. The mixture was then suitable for coating.

EXAMPLE IX

One unit of a cyan color former emulsion was made as described in Example VII by substituting for the color former thereof m(1-acetoxy-2-naphthalenesulfonamido)benzaldehyde polyvinyl acetal (prepared as described in application Serial Number 667,111, filed May 3, 1946, now Patent No. 2,423,572).

One-fourth of the above emulsion was mixed at 112° F. with 60 cc. of 9% Na2SO4 solution and 12 cc. of a 5% aqueous solution of diethylene glycol boriborate. The emulsion readily coagulated to a gel which was extruded into 625 cc. of acetone and hardened for 30 minutes.

EXAMPLE X

One unit of a cyan color former emulsion was mixed as described in Example IX. One-fourth unit of this emulsion was mixed at 112° F. with 250 cc. of ethanol. To this mixture 90 cc. of an aqueous solution containing 0.375 gram of boric acid was added and the mixture was chilled. The emulsion coagulated readily to a gel which was extruded into 625 cc. of 9% sodium sulfate solution and hardened for 30 minutes before washing. The washed emulsion was prepared for coating in the manner described under Procedure A.

The washed emulsions can be prepared for coating in the usual manner. Preferred methods of coating are described in related application Serial Number 712,721, filed on even date herewith. These methods involve coating the alkaline emulsions onto a sublayer which contains a water-soluble boron compound which forms a borate ion in solution. The sublayer should have a pH of 6 or less. The boron compound diffuses into the emulsion layer as it is coated and causes it to gel or set at a rapid rate. Suitable procedures for coating the washed emulsions which embody the invention of the aforesaid application follow.

PROCEDURE A

The washed noodles of the cyan color former emulsion of Example IX, for instance, can be dissolved in 150 cc. of ethanol and 225 cc. of water with stirring for ten minutes at 170° F. Four hundred and seventy-five cubic centimeters (475 cc.) of a 5% aqueous solution of the same color former was added. The mixture was stirred 20 minutes at 170° F. and filtered hot. The emulsion was diluted to a suitable coating viscosity with 1:4 ethanol/water and 20 cc. of 0.9 N KCl were added and the emulsion digested 60 minutes at 150° F. After cooling to 90° F., 12.4 cc. of a 3% aqueous solution of N-cetylbetaine and 27.4 cc. of a 20% aqueous solution of triethanolamine were added and the emulsion then coated onto a hydrolyzed ethylene/vinyl acetate layer containing ethylene glycol-borax-boric acid condensation product of Example I and having a pH less than 6 which was carried by a support. The layer readily gelled. Similar results were obtained with the magenta color former of Example VIII and the yellow color former of Example VII with minor modifications of the proportions of the ingredients.

PROCEDURE B

One-fourth unit of washed noodles of an emulsion, prepared as described in Example VI, were added to 330 cc. of a 10% aqueous solution of a high viscosity polyvinyl alcohol and 200 cc. of water. The resulting mixture was stirred for 15 minutes at 150° F. It was then coated at 22 feet per minute at 90° F. onto a sublayer of the type described in Procedure A. A satisfactory gelling of the emulsion readily took place.

In place of the specific gelling agents described above, there may be substituted other boric acid esters or salts capable of yielding borate ions in aqueous solution. Suitable additional compounds include sodium and potassium tetraborate, metaborate, and orthoborate, boric acid, glyceryl borate, glycerol-borax-boric acid condensation products; the sorbitol, mannitol, and dulcitol monoborate and diborates and mono- and poly-condensation products and their sodium and ammonium salts set forth in Examples 1 to 19 of United States Patent 2,223,349 and Examples 3, 4, 5, 7, 9, 14, and 18 to 35 of United States Patent 2,223,948. The pH of these products runs from about 2.0 to 10.4. Still other useful boric acid esters are those of 1,2,3,4,5-pentahydroxyhexane, persitol, valemitol, octahydroxyoctanes, monohydroxynonanes, conylene glycol, xylylene glycol, inositol, cyclohexane-diol, etc. Mixtures of two or more of such esters and/or salts or boric acid can be used.

In place of the acetone hardening bath for the noodles, one may use concentrated solutions of sodium sulfate, disodium phosphate, or sodium silicate.

Similarly in place of the specific hydrophilic hydroxyl polymers of Examples VII, VIII, and IX, there may be substituted other hydrophilic color formers including the polyvinyl acetal color formers of United States Patents 2,310,943 and 2,320,422 and the color formers of United States Patents 2,397,865 and 2,397,864 and applications Serial Numbers 528,946, filed March 31, 1944, and 682,137, filed July 8, 1946.

An advantage of the invention resides in the fact that it provides synthetic hydroxyl polymer silver halide emulsions of higher speed and contrast. The emulsions are of uniform quality and do not contain hardened coagulated particles. The procedure enables one to control the coagulation. It proceeds more slowly and uniformly and localized coagulation is avoided.

The treatment in a mixture of the boric acid compound and a coagulating agent as described above gives a temporary gel which can be readily extruded and the hardened particles washed from soluble salts.

The invention provides a practical and effective method for washing excess soluble salts from synthetic hydroxyl polymer emulsions. The emulsion shreds or particles do not coalesce or agglomerate during washing, yet after washing they can be readily mixed with additional polymer and flowable coating solutions obtained for the manufacture of light-sensitive layers.

As many widely different embodiments of this invention can be made without departing from the spirit and scope thereof, it is to be understood that the invention is not to be limited except as defined by the claims.

What is claimed is:

1. The process which comprises treating an aqueous solution of a water-soluble to hydrophilic synthetic hydroxyl polymer silver halide emulsion, said polymer containing a plurality of recurring intralinear

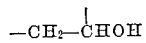

groups, with a mixture of boric acid ester of diethylene glycol and sodium sulfate, said ester and sodium sulfate being present in insufficient quantity alone but in sufficient quantity together to effect a material gelling of the hydroxyl polymer, adjusting the pH of the solution to more than 7, extruding the resulting gel into an acetone bath and washing the resulting shreds with water.

2. The process which comprises treating an aqueous solution of a water-soluble to hydrophilic synthetic hydroxyl polymer-silver halide emulsion, said polymer containing a plurality of intralinear

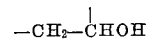

groups, with a mixture of a soluble boron compound capable of yielding borate ions, and a coagulating agent said boron compound and coagulating agent being present in insufficient quantity alone but in sufficient quantity together to effect a material gelling of the hydroxyl polymer, said coagulating agent being taken from the group consisting of methanol, ethanol, acetone and concentrated alkali metal-sulfate, -phosphate and -silicate solutions, and adjusting the pH to more than 7.

3. The process which comprises treating an aqueous solution of a synthetic hydroxyl polymer silver halide emulsion, said polymer containing a plurality of recurring intralinear

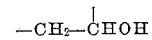

groups with a mixture of a soluble boron compound capable of yielding borate ions, and a coagulating agent said boron compound and coagulating agent being present in insufficient quantity alone but in sufficient quantity together to effect a material gelling of the hydroxyl polymer and adjusting the pH to more than 7, extruding the resulting gel into a bath containing a coagulating agent, said coagulating agent being taken from the group consisting of methanol, ethanol, acetone and concentrated alkali metal-sulfate, -phosphate and -silicate solutions and washing the resulting shreds.

4. The process which comprises treating an aqueous solution of a water-soluble to hydrophilic synthetic hydroxyl polymer silver halide emulsion, said polymer containing a plurality of recurring intralinear

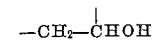

groups, with a mixture of a soluble boron compound capable of yielding borate ions, and a coagulating agent said boron compound and coagulating agent being present in insufficient quantity alone but in sufficient quantity together to effect a material gelling of the hydroxyl polymer, said coagulating agent being taken from the group consisting of methanol, ethanol, acetone and concentrated alkali metal-sulfate, -phosphate and -silicate solutions, and adjusting the pH to more than 7, extruding the resulting gel into an acetone bath and washing the resulting shreds with water.

5. The process which comprises treating an aqueous solution of a polyvinyl alcohol silver halide emulsion with a mixture of a soluble boron compound capable of yielding borate ions, and a coagulating agent said boron compound and coagulating agent being present in insufficient quantity alone but in sufficient quantity together to effect a material gelling of the polyvinyl alcohol, said coagulating agent being taken from the group consisting of methanol, ethanol, acetone and concentrated alkali metal-sulfate, -phosphate and -silicate solutions and adjusting the pH to more than 7.

6. The process which comprises treating an aqueous solution of a hydrophilic hydrolyzed ethylene/vinyl acetate interpolymer silver halide emulsion with a mixture of a soluble boron compound capable of yielding borate ions, and a coagulating agent said boron compound and coagulating agent being present in insufficient quantity alone but in sufficient quantity together to effect a material gelling of the interpolymer, said coagulating agent being taken from the group consisting of methanol, ethanol, acetone and concentrated alkali metal-sulfate, -phosphate and -silicate solutions, and adjusting the pH to more than 7.

7. The process which comprises treating an aqueous solution of a synthetic hydroxyl polymer silver halide emulsion said polymer containing a plurality of recurring

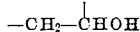

groups with a mixture of a boric acid ester of a polyhydric alcohol and a coagulating agent said ester and coagulating agent being present in insufficient quantity alone but in sufficient quantity together to effect a material gelling of the hydroxyl polymer, said coagulating agent being taken from the group consisting of methanol, ethanol, acetone and concentrated alkali metal-sulfate, -phosphate and -silicate solutions, and adjusting the pH to more than 7.

8. The process which comprises treating an aqueous solution of a polyvinyl alcohol silver halide emulsion with a mixture of a boric acid ester of a polyhydric alcohol and a coagulating agent said ester and coagulating agent being present in insufficient quantity alone but in sufficient quantity together to effect a material gelling of the polyvinyl alcohol, said coagulating agent being taken from the group consisting of methanol, ethanol, acetone and concentrated alkali metal-sulfate, -phosphate and -silicate solutions and adjusting the pH to more than 7.

9. The process which comprises treating an aqueous solution of a hydrophilic hydrolyzed ethylene/vinyl acetate interpolymer silver halide emulsion with a mixture of a boric acid ester of a polyhydric alcohol and a coagulating agent said ester and coagulating agent being present in insufficient quantity alone but in sufficient quantity together to effect a material gelling of the interpolymer, said coagulating agent being taken from the group consisting of methanol, ethanol, acetone and concentrated alkali metal-sulfate, -phosphate and -silicate solutions, and adjusting the pH to more than 7.

CHARLES F. GLICK.
POSTELL M. NICHOLES.

REFERENCES CITED

The following references are of record in the file of this patent:

UNITED STATES PATENTS

| Number | Name | Date |
| --- | --- | --- |
| 2,281,703 | Lowe | May 5, 1942 |
| 2,376,371 | Lowe et al. | May 22, 1945 |
| 2,384,072 | Brubaker | Sept. 4, 1945 |